(12) United States Patent
Kang et al.

(10) Patent No.: US 9,813,656 B2
(45) Date of Patent: Nov. 7, 2017

(54) METHOD AND APPARATUS FOR PROVIDING A CHANNEL SERVICE

(71) Applicant: Alticast Corporation, Seoul (KR)

(72) Inventors: Chang-Hwan Kang, Gyeonggi-Do (KR); Sung Woo Nam, Seoul (KR); Jin-Gwan Kim, Seoul (KR); Da-Hye Hyoung, Gwangju (KR); Jae-Hwan Park, Seoul (KR); Jung-Ik Lee, Seoul (KR); Ju-Hyun Won, Gyeongsangbuk-Do (KR)

(73) Assignee: Alticast Corporation, Seoul (KR)

( * ) Notice: Subject to any disclaimer, the term of this patent is extended or adjusted under 35 U.S.C. 154(b) by 0 days.

(21) Appl. No.: 14/643,533

(22) Filed: Mar. 10, 2015

(65) Prior Publication Data

US 2015/0256890 A1  Sep. 10, 2015

(30) Foreign Application Priority Data

Mar. 10, 2014 (KR) .................. 10-2014-0027632

(51) Int. Cl.
*H04N 21/482* (2011.01)
*H04N 5/44* (2011.01)
*H04N 5/445* (2011.01)

(52) U.S. Cl.
CPC ....... *H04N 5/4403* (2013.01); *H04N 5/44543* (2013.01); *H04N 21/482* (2013.01); *H04N 21/4821* (2013.01); *H04N 21/4823* (2013.01); *H04N 2005/44556* (2013.01)

(58) Field of Classification Search
CPC ........... H04N 21/4823; H04N 21/4821; H04N 21/482; H04N 5/44543; H04N 5/4403; H04N 2005/44556
See application file for complete search history.

(56) References Cited

U.S. PATENT DOCUMENTS

| | | | | |
|---|---|---|---|---|
| 6,766,526 B1* | 7/2004 | Ellis | ...................... | H04N 21/482 348/569 |
| 2003/0070168 A1* | 4/2003 | Stone | .................. | H04N 21/2541 725/37 |
| 2005/0275758 A1* | 12/2005 | McEvilly | ......... | H04N 21/23106 348/725 |
| 2008/0046932 A1* | 2/2008 | Stallings | ............ | H04N 21/4314 725/52 |
| 2008/0276277 A1* | 11/2008 | Ahn | .................. | H04N 21/44222 725/40 |
| 2008/0307464 A1* | 12/2008 | Azera | .................... | H04H 60/43 725/56 |
| 2009/0133051 A1* | 5/2009 | Hildreth | ............. | H04N 21/4532 725/28 |
| 2010/0020249 A1* | 1/2010 | Randall | ............ | H04N 21/44222 348/731 |

(Continued)

*Primary Examiner* — Randy Flynn
(74) *Attorney, Agent, or Firm* — Mintz Levin Cohn Ferris Glovsky and Popeo, P.C.; Kongsik Kim; Jonathon Western

(57) ABSTRACT

A method and an apparatus for providing a channel service are disclosed. The method may generate a channel list including a channel number inputted by a user and a main viewing channel list and display together the channel list and the main viewing channel list. Here, the channel list includes at least one channel of which number starts from the inputted channel number, and the main viewing channel list includes one or more channels viewed mainly by the user with the received channel number.

8 Claims, 4 Drawing Sheets

(56) References Cited

U.S. PATENT DOCUMENTS

2013/0176506 A1* 7/2013 Lee .................. H04N 21/42204
 348/734
2013/0276030 A1* 10/2013 Fujimoto ........... H04N 21/4316
 725/40

* cited by examiner

METHOD AND APPARATUS FOR PROVIDING A CHANNEL SERVICE

CROSS-REFERENCE TO RELATED APPLICATIONS

This application claims the benefit of Korean Patent Application No. 10-2014-0027632, filed with the Korean Intellectual Property Office on Mar. 10, 2014, the disclosure of which is incorporated herein by reference in its entirety.

TECHNICAL FIELD

The present invention relates to a method and an apparatus for providing a channel service which provides simultaneously information concerning channels of which numbers start from a channel number inputted by a user and information concerning channels viewed mainly by the user with the inputted channel number.

DESCRIPTION OF THE RELATED ART

In the past, the TV set provided unidirectional services only, but it is now possible to compress broadcast signals, which may include video, audio and data, into digital signals according as digital broadcasting standard has been actively studied in recent, and thus the possibility of providing multiple channels is opened. Moreover, increases in network processing capacity have also made it possible to provide bidirectional broadcast services.

Based on improvements in the performance of the set-top box or TV set as well as increases in network bandwidth, various types of services are being provided, including not only live programs, which have been provided in the past, but also various on-demand programs requested by the user. Of course, the various services currently being provided also include games, shopping, etc., in addition to real-time or on-demand programming.

Various services are being provided through the set-top box or the TV as mentioned above, but the problem exists in that a user should input in sequence every channel number when the user selects desired channel, because the set-top box or the TV is controlled by an external remote controller.

SUMMARY

An aspect of the invention is to provide a method and an apparatus for providing a channel service which provides simultaneously information concerning channels of which numbers start from a channel number inputted by a user and information concerning channels viewed mainly by the user with the inputted channel number.

An embodiment of the invention provides a method of providing a channel service, the method comprising: (a) receiving a channel number from a user; (b) generating a channel list and a main viewing channel list; and (c) outputting together the channel list and the main viewing channel list, wherein the channel list includes at least one channel of which number starts from the received channel number, and the main viewing channel list includes one or more channels viewed mainly by the user with the received channel number.

Another embodiment of the invention provides an apparatus for providing simultaneously information concerning channels of which numbers start from a channel number inputted by a user and information concerning channels viewed mainly by the user with the inputted channel number.

Still another embodiment of the invention provides a broadcasting terminal comprising: an input unit configured to receive a channel number from a user; a channel list generating unit configured to generate a channel list and a main viewing channel list; and a display unit configured to output the channel list and the main viewing channel list, wherein the channel list includes at least one channel of which number starts from the received channel number, and the main viewing channel list includes one or more channels viewed mainly by the user with the received channel number.

A method and an apparatus for providing a channel service according to one embodiment of the present invention provide simultaneously information concerning channels of which numbers start from a channel number inputted by a user and information concerning channels viewed mainly by the user with the inputted channel number, thereby enhancing convenience of the user.

Additional aspects and advantages of the present invention will be set forth in part in the description which follows, and in part will be obvious from the description, or may be learned by practice of the invention.

DETAILED DESCRIPTION

Figure 1:
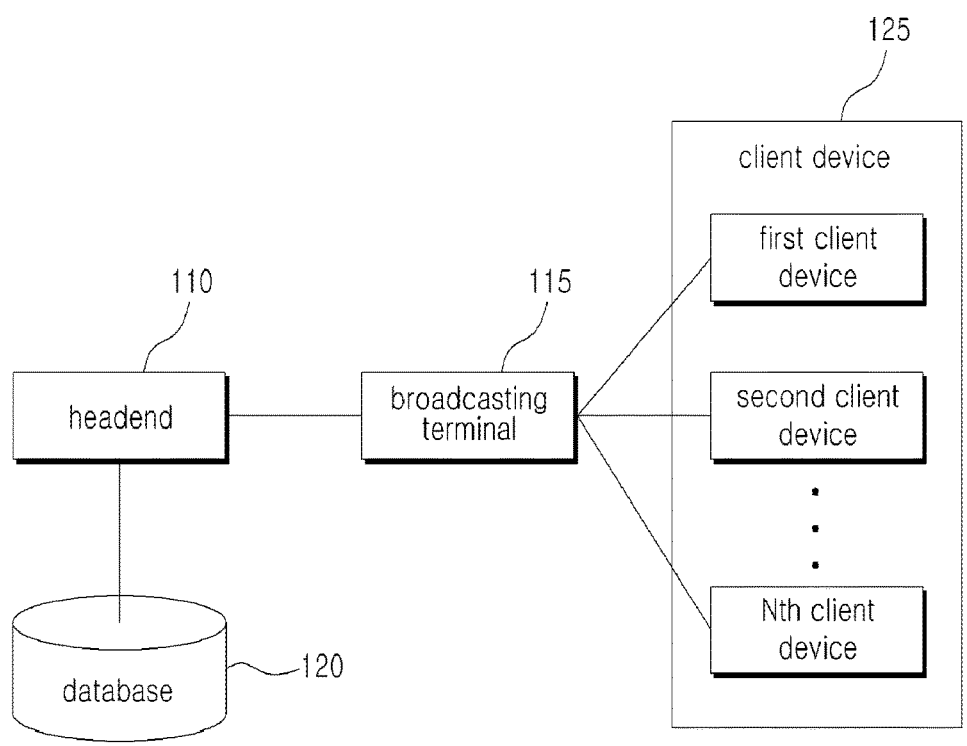
FIG. 1 is a view illustrating schematically a system for providing a broadcasting service according to one embodiment of the present invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. Also, when it is considered that detailed description on a related art of the present invention may obscure the points of the description, the description will not be provided herein. Hereinafter, embodiments of the present invention will be described in detail with reference to the accompanying drawings.

While such terms as "first" and "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Certain embodiments of the present invention will be described below in more detail with reference to the accompanying drawings.

FIG. 1 is a view illustrating schematically a system for providing a broadcasting service according to one embodiment of the present invention.

In FIG. 1, the system for providing the broadcasting service of the present embodiment may include a headend 110 and a broadcasting terminal 120 connected to the headend 110 through a network. Additionally, the broadcasting terminal 120 may be connected to at least one client device 125.

The headend 110 provides live programs or on-demand programs according to preset schedule.

The headend 110 converts audio signals and video signals (hereinafter, referred to as "AV signal") for various broadcasting channels into broadcasting signals with predetermined format, and transmits the converted broadcasting signals and an electric program guide EPG to the broadcasting terminal 115.

The headend 110 receives AV data concerning on-demand programs and information related to the on-demand programs from contents providers and stores the received AV data and the information in a database 120. Here, the information related to the on-demand programs may include description information of the on-demand programs.

The broadcasting terminal 115 receives the on-demand program or the live program from the headend 110, and provides on-demand program or a live program requested by the client device 125 to the client device 125.

The broadcasting terminal 115 may output simultaneously a channel list including inputted channel number and a main viewing channel list viewed mainly by a user when the user inputs the channel number through an external remote controller (not shown). This will be described in detail with reference to following FIG. 2.

For example, the broadcasting terminal 115 may be a TV or a set-top box. However, the broadcasting terminal 115 is not limited as the TV or the set-top box, and may include every device which can receive the broadcasting signal such as a smart phone, a table PC, a desktop, etc. Hereinafter, the broadcasting terminal 115 will be assumed as the set-top box connected to the client device TV as a display.

Figure 2:
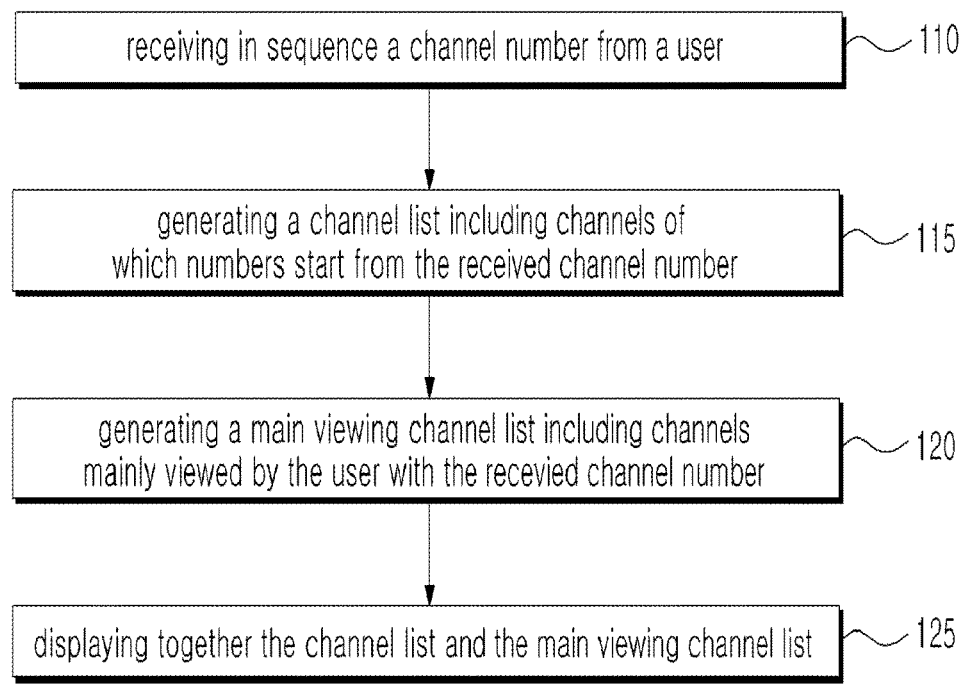
FIG. 2 is a flowchart illustrating a method of providing a channel service on the broadcasting terminal according to one embodiment of the present invention.
Figure 3:
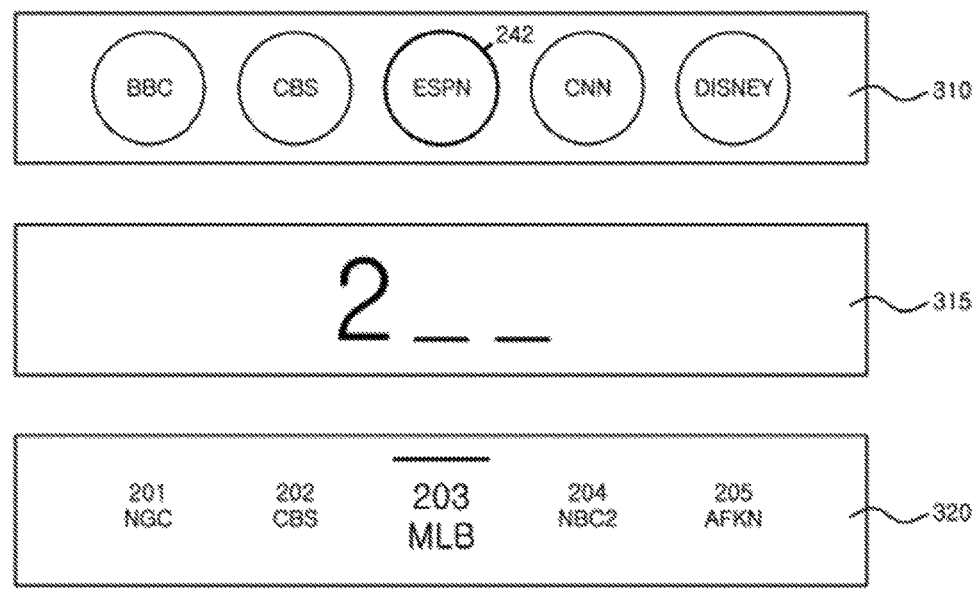
FIG. 3 is a view illustrating an example of providing the channel service according to one embodiment of the present invention.

FIG. 2 is a flowchart illustrating a method of providing a channel service on the broadcasting terminal according to one embodiment of the present invention, and FIG. 3 is a view illustrating an example of providing the channel service according to one embodiment of the present invention.

In step of S210, the broadcasting terminal 115 receives a channel number through an input device, e.g. the external remote controller.

In step of S215, the broadcasting terminal 115 generates a channel list including channels of which numbers start from the received channel number.

In one embodiment, the broadcasting terminal 115 may select n (is a natural number) channels from the channels of which the numbers start from the received channel number and generate a channel list including the selected channels. The broadcasting terminal 115 may select n channels, in high order of similarity with the received channel number, from the channels of which the numbers start from the received channel number and generate a channel list including the selected channels.

For example, as shown in FIG. 3, it is assumed that the user inputs a channel number "2" by using the external remote controller.

For instance, the broadcasting terminal 115 may select n channels, in high order of similarity with the inputted channel number "2", from the channels of which numbers start from "2". That is, if the channel list includes five channels, channels "201", "202", "203", "204" and "205" are selected and the channel list including the selected channels may be generated.

For another example, it is assumed that the user inputs channel numbers "22". Channels "221", "222", "223", "224" and "225" are selected in high order of similarity with the inputted channel numbers "22", and the channel list including the selected channels may be generated.

In another embodiment, the broadcasting terminal 115 may not include a channel, which starts from the inputted channel number but is not subscribed by the user, in the channel list. For example, if channels "222" and "225" are subscription channels viewable only when the user subscribes and are not subscribed presently, the broadcasting terminal 115 may select channels "221", "223", "224", "226" and "227" except the channels "222" and "225" when the user selects n channels in high order of similarity, and generate the channel list including the selected channels.

In still another embodiment, the broadcasting terminal 115 may generate a channel list including channels selected from the channels of which the numbers start from the inputted channel number, with excluding channels of which right to watching is limited according to predetermined setting information. Here, the setting information may include information concerning right to watching channels set based on age, time zone, date, day, etc.

Accordingly, the broadcasting terminal 115 may generate the channel list including channels in high order of similarity with the inputted channel number, with excluding the channels which right to watching is limited according to the setting information, from the channels of which the numbers start from the inputted channel number.

It is assumed that channels "221", "222", "223", "224" and "225" are selected in order of similarity with the inputted channel number "22". If right to watching for example a channel "223" is limited according to the setting information, the broadcasting terminal 115 may generate the channel list including channels "221", "222", "224", "225" and "226" except the channel "223".

Here, the similarity may be determined by difference between the inputted channel number and number of the channel of which the number starts from the inputted channel number.

In still another embodiment, a channel in order of rank of the channels of which the numbers start from the inputted channel number may be determined as high similarity of a channel.

In step of S220, the broadcasting terminal 115 generates a main viewing channel list including channels (main viewing channel) viewed mainly by the user with received channel number.

Here, the main viewing channel means a channel viewed mainly by the user, and may be selected by using a history.

The history may store information concerning channels which the user selects and views, and store also viewing number of a channel (frequency), viewing time, viewing date and total accumulated viewing time, etc.

Accordingly, the broadcasting terminal 115 may select channels having high viewing number (frequency), channels having long viewing time or channels viewed recently by the user as the main viewing channels, from the channels including the channel number inputted by the user by using the history, and generate the main viewing channel list including the selected channels.

Of course, the broadcasting terminal 115 may select channels, as the main viewing channel, from the channels including the channel number inputted by the user based on combination of the viewing number, the viewing time and the viewing date (or time) in the history, and generate the main viewing channel list including the selected channels.

In still another embodiment, in the event that the broadcasting terminal 115 stores a user setting concerning channels such as favorite channels, etc. besides the history, the broadcasting terminal 115 may select the main viewing channel considering further the favorite channels, etc.

In the event that the broadcasting terminal 115 stores setting information concerning right to watching channels, the broadcasting terminal 115 may exclude channels, which right to watching are limited, with reference to further the setting information when the main viewing channel is selected.

In step of S225, the broadcasting terminal 115 outputs together the generated channel list and the generated main viewing channel list.

As shown in FIG. 3, the channel list and the main viewing channel list may be displayed on different areas, respectively.

In the event that the user inputs the channel number by using the remote controller, the broadcasting terminal 115 may generate the channel list including the channels of which the numbers start from the inputted channel number, and then output the generated channel list on a first area 320.

Additionally, the broadcasting terminal 115 may output the main viewing channel list, including the channels viewed mainly by the user selected from the channels including the inputted channel number with reference to the history, on a second area 310.

As shown in FIG. 3, the broadcasting terminal 115 displays separately the channel list including the channels of which the numbers start from the channel number inputted by the user and the main viewing channel list on different areas, so that the user may select easily the channels.

Additionally, the user may select easily the channels though the user does not input every channel number, and thus convenience of the user may be enhanced.

Figure 4:
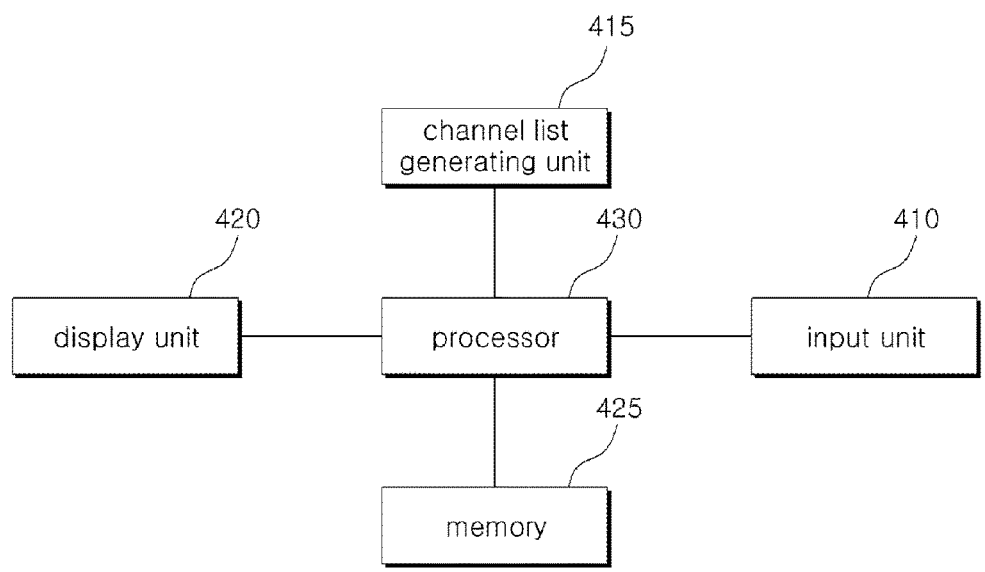
FIG. 4 is a block diagram illustrating schematically a broadcasting terminal according to one embodiment of the present invention.

FIG. 4 is a block diagram illustrating schematically a broadcasting terminal according to one embodiment of the present invention.

In FIG. 4, the broadcasting terminal 115 of the present embodiment includes an input unit 410, a channel list generating unit 415, a display unit 420, a memory 425 and a processor 430.

The input unit 410 is a means for receiving in sequence channel numbers from the user.

For example, the input unit 410 may receive the channel number through the external remote controller.

The channel list generating unit 415 generates the channel list including the channel number inputted through the input unit 410 and the main viewing channel list.

For example, the channel list generating unit 415 may generate the channel list including the channels of which the numbers start from the channel number inputted through the input unit 410.

Furthermore, the channel list generating unit 415 may select the channels, viewed mainly by the user with the inputted channel number according to the history, and generate the main viewing channel list including the selected channels.

Since operation of these elements is the same as in FIG. 2, any further description concerning the same element will be omitted.

The display unit 420 outputs separately the channel list and the main viewing channel list on different areas, wherein the channel list and the main viewing channel are displayed simultaneously. Of course, the display unit 420 may also output various data in type of visual information.

The memory 425 stores various algorithms needed for operating the broadcasting terminal 115, program editing information, channel information, etc.

The processor 430 controls internal elements of the broadcasting terminal 115, e.g. the input unit 410, the channel list generating unit 415, the display unit 420, the memory 425, etc.

The method of providing a channel service according to an embodiment of the invention, can be implemented in the form of program instructions that can be executed by various means for processing electronic information, and can be recorded on a storage medium. The storage medium can include program instructions, data files, data structures, etc., alone or in combination.

The program instructions recorded on the medium can be designed and configured specifically for the present invention or can be a type of medium known to and used by the skilled person in the field of computer software. Examples of a storage medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a means for electronically processing information through the use of an interpreter, etc.

The hardware mentioned above can be made to operate as one or more software modules that perform the actions of the embodiments of the invention, and vice versa.

The embodiments of the invention described above are disclosed for illustrative purposes. Those of ordinary skill in the art to which the present invention pertains would understand that various modifications, alterations, and additions can be made without departing from the spirit and scope of the invention, and that such modifications, alterations, and additions are encompassed by the scope of claims defined below.

The invention claimed is:

1. A method of providing a channel service at a broadcasting terminal including a memory storing program instructions and a processor executing the stored program instructions to control operation of the broadcasting terminal, the method comprising:
   (a) receiving, by the processor, a channel number from a user;
   (b) generating, by the processor, a channel list and a main viewing channel list; and
   (c) outputting, by the processor, i) an image of the received channel number on a center area of a display, ii) images of channels included in the main viewing channel list related to the received channel number on an upper area of the display spatially separated from the center area of the display, and iii) images of channels included in the channel list related to the received channel number on a lower area of the display spatially separated from the center area of the display, wherein the images outputted on the upper area and the lower area of the display, respectively, are dynamically changed according to the received channel number being outputted on the center area of the display, the channel list and the main viewing channel list, respectively, include plural channels selected by different criteria based on the received channel number, the channel list includes at least one channel of which number starts with the received channel number, the main viewing channel list includes one or more channels viewed mainly by the user with the received channel number, when a same channel is included in both of the main viewing channel list and the channel list in response to the received channel number, a first image of the same channel is outputting in the upper area of the display, and a second image of the same channel is outputted in the lower area of the display, such that the first image and the second image are positioned to at least partially vertically overlap one another, a channel is excluded from the channel list and the main viewing channel list when a right to view the channel is limited according to predetermined setting information, and the predetermined setting information includes information concerning the right to view a particular channel based on at least one of: a range of time, a date, and a day.

2. The method of claim 1, wherein n channels in high order of viewing frequency, n channels in order of long viewing time or n channels viewed recently are selected from the channels including the channel number according to a history having information concerning channels viewed by the user, and the main viewing channel list includes the selected channels.

3. The method of claim 1, wherein in the step (b), a channel is excluded from the channel list and the main viewing channel list when viewing the channel is impossible because the user does not subscribe to the channel.

4. The method of claim 1, wherein the first image of the same channel is different from the second image of the same channel.

5. A non-transitory recorded storage medium readable by a processing device tangibly embodying a program code executable by the processing device to perform a method of providing a channel service at a broadcasting terminal, the method comprising:

(a) receiving a channel number from a user;

(b) generating a channel list and a main viewing channel list; and (c) outputting i) an image of the received channel number on a center area of a display, ii) images of channels included in the main viewing channel list related to the received channel number on an upper area of the display spatially separated from the center area of the display, and iii) images of channels included in the channel list related to the received channel number on a lower area of the display spatially separated from the center area of the display, wherein the images outputted on the upper area and the lower area of the display, respectively, are dynamically changed according to the received channel number being outputted on the center area of the display, the channel list and the main viewing channel list, respectively, include plural channels selected by different criteria based on the received channel number, the channel list includes at least one channel of which number starts with the received channel number, the main viewing channel list includes one or more channels viewed mainly by the user with the received channel number, when a same channel is included in both of the main viewing channel list and the channel list in response to the received channel number, a first image of the same channel is outputting in the upper area of the display, and a second image of the same channel is outputted in the lower area of the display, such that the first image and the second image are positioned to at least partially vertically overlap one another, a channel is excluded from the channel list or the main viewing channel list when a right to view the channel is limited according to predetermined setting information, and the predetermined setting information includes information concerning the right to view a particular channel based on at least one of: a range of time, a date, and a day.

6. A broadcasting terminal including a memory storing program instructions and a processor executing the stored program instructions to control operation of the broadcasting terminal, the broadcasting terminal comprising:

an input unit operatively coupled to the processor and receiving a channel number from a user;

a channel list generating unit operatively coupled to the processor and generating a channel list and a main viewing channel list; and a display unit operatively coupled to the processor and outputting i) an image of the received channel number on a center area of a display, ii) images of channels included in the main viewing channel list related to the received channel number on an upper area of the display spatially separated from the center area of the display, and iii) images of channels included in the channel list related to the received channel number on a lower area of the display spatially separated from the center area of the display, wherein the images outputted on the upper area and the lower area of the display, respectively, are dynamically changed according to the received channel number being outputted on the center area of the display, the channel list and the main viewing channel list, respectively, include plural channels selected by different criteria based on the received channel number, the channel list includes at least one channel of which number starts with the received channel number, the main viewing channel list includes one or more channels viewed mainly by the user with the received channel number, when a same channel is included in both of the main viewing channel list and the channel list in response to the received channel number, a first image of the same channel is outputting in the upper area of the display, and a second image of the same channel is outputted in the lower area of the display, such that the first image and the second image are positioned to at least partially vertically overlap one another, a channel is excluded from the channel list or the main viewing channel list when a right to view the channel is limited according to predetermined setting information, and the predetermined setting information includes information concerning the right to view a particular channel based on at least one of: a range of time, a date, and a day.

7. The broadcasting terminal of claim 6, wherein the channel list generating unit selects n channels in high order of viewing frequency, n channels in order of long viewing time or n channels viewed recently from the channels including the channel number according to a history having information concerning channels viewed by the user, and generates the main viewing channel list including the selected channels.

8. The broadcasting terminal of claim 7, wherein a channel is excluded from the channel list and the main viewing channel list when viewing the channel is impossible because the user does not subscribe to the channel.

* * * * *